US009916107B2

(12) United States Patent
Bolik et al.

(10) Patent No.: US 9,916,107 B2
(45) Date of Patent: *Mar. 13, 2018

(54) MANAGEMENT OF CONFIGURATIONS FOR EXISTING STORAGE INFRASTRUCTURE

(71) Applicant: International Business Machines Corporation, Armonk, NY (US)

(72) Inventors: Christian Bolik, Oldenburg (DE); Dietmar Noll, Bad Soden-Salm (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/927,009

(22) Filed: Oct. 29, 2015

(65) Prior Publication Data

US 2016/0147477 A1    May 26, 2016

Related U.S. Application Data

(63) Continuation of application No. 14/551,967, filed on Nov. 24, 2014.

(51) Int. Cl.
*G06F 17/30* (2006.01)
*G06F 3/06* (2006.01)
*G06F 9/445* (2018.01)

(52) U.S. Cl.
CPC .......... *G06F 3/0634* (2013.01); *G06F 3/0607* (2013.01); *G06F 3/0683* (2013.01);
(Continued)

(58) Field of Classification Search
None
See application file for complete search history.

(56) References Cited

U.S. PATENT DOCUMENTS 6,148,407 A * 11/2000 Aucsmith ............... G06F 21/57
726/16
7,017,044 B1 * 3/2006 Carpenter ............... G06F 21/10
705/57
(Continued)

FOREIGN PATENT DOCUMENTS

JP    2009169950 A    7/2009

OTHER PUBLICATIONS

Anonymous, "Fabric Zone Creation Based on Analysis of Existing Zones", IP.Com Prior Art Database Technical Disclosure, IP.Com No. IPCOM000234101D, Jan. 13, 2014, pp. 1-5. http://ip.com/IPCOM/000234101.

(Continued)

*Primary Examiner* — Rehana Perveen
*Assistant Examiner* — Raheem Hoffler
(74) *Attorney, Agent, or Firm* — Peter J. Edwards

(57) ABSTRACT

The method for managing one or more standard configurations includes calculating a plurality of configuration fingerprints for a plurality of storage systems. The configuration fingerprint is a numerical value that represents information about a configuration for one or more components of a storage system. The method also includes building a result set that includes the plurality of configuration fingerprints for the plurality of storage systems. The method also includes identifying a plurality of standard configurations for the plurality of storage systems from the result set based on the plurality of configuration fingerprints. The method also includes determining that a first storage system from the plurality of storage systems meets a standard configuration from the plurality of standard configurations. The method also includes creating metadata within the first storage system that describes the standard configuration.

7 Claims, 11 Drawing Sheets

(52) U.S. Cl.
CPC ...... *G06F 9/44505* (2013.01); *G06F 17/3053* (2013.01); *G06F 17/30289* (2013.01); *G06F 17/30312* (2013.01); *G06F 17/30345* (2013.01); *G06F 17/30864* (2013.01); *G06F 17/30867* (2013.01)

(56) References Cited

U.S. PATENT DOCUMENTS

| | | | |
|---|---|---|---|
| 7,877,560 | B2 | 1/2011 | Fujibayashi |
| 7,921,246 | B2 | 4/2011 | Bolik et al. |
| 8,073,880 | B2 | 12/2011 | LaMonica |
| 8,166,257 | B1 | 4/2012 | Holl, II et al. |
| 8,239,584 | B1 | 8/2012 | Rabe et al. |
| 8,688,830 | B2 | 4/2014 | DeHaan |
| 9,165,124 | B1 * | 10/2015 | Gurevich ................ G06F 21/30 |
| 9,417,892 | B2 | 8/2016 | Croy et al. |
| 2004/0243699 | A1 | 12/2004 | Koclanes et al. |
| 2009/0182777 | A1 | 7/2009 | Bolik et al. |
| 2011/0093503 | A1 * | 4/2011 | Etchegoyen .......... G06F 21/121 707/780 |
| 2013/0318134 | A1 | 11/2013 | Bolik et al. |
| 2016/0019296 | A1 | 1/2016 | Sullivan et al. |
| 2016/0147759 | A1 * | 5/2016 | Bolik ................ G06F 17/30289 707/723 |

OTHER PUBLICATIONS

EMC², "EMC Storage Resource Management Suite: How Storage Resource Management Suite Meets Today's Storage Management Challenges", White Paper, Mar. 2013, pp. 1-18, Part No. H11199, Copyright © 2013 EMC Corporation.

Mell et al., "The NIST Definition of Cloud Computing", National Institute of Standards and Technology, NIST Special 800-145, Sep. 2011, 7 pages, Gaithersburg, MD.

Bolik et al., "Management of Configurations for Existing Storage Infrastructure," U.S. Appl. No. 14/551,967, filed Nov. 24, 2014.

List of IBM Patents or Patent Applications Treated as Related, dated Oct. 28, 2015, 2 pages.

* cited by examiner

MANAGEMENT OF CONFIGURATIONS FOR EXISTING STORAGE INFRASTRUCTURE

BACKGROUND

The present disclosure relates to storage devices, and more specifically, to configuration identification within storage devices.

Storage systems are an important part of any computer system. Storage systems may have one or more standard configurations which determine how the storage system handles certain storage activities. These standard configurations can be identified so that the standard configurations can be associated with any storage device that is present within a computer system.

SUMMARY

According to embodiments of the present disclosure, a method, a system, and a computer program product are provided for managing one or more standard configurations.

One embodiment provides for a method for managing one or more standard configurations. The method includes calculating a plurality of configuration fingerprints for a plurality of storage systems. The configuration fingerprint is a numerical value that represents information about a configuration for one or more components of a storage system. The method also includes building a result set that includes the plurality of configuration fingerprints for the plurality of storage systems. The method also includes identifying a plurality of standard configurations for the plurality of storage systems from the result set based on the plurality of configuration fingerprints. The method also includes determining that a first storage system from the plurality of storage systems meets a standard configuration from the plurality of standard configurations. The method also includes creating metadata within the first storage system that describes the standard configuration.

Another embodiment provides for a system for managing one or more standard configurations. The system can include a plurality of storage systems. The system also includes a memory and a processor device communicatively coupled to the memory. The system also includes a configuration analyzer communicatively coupled to the memory and the processor device. The configuration analyzer is configured to calculate a plurality of configuration fingerprints for the plurality of storage systems. The configuration fingerprint is a numerical value that represents information about a configuration for one or more components of a storage system. The configuration analyzer is configured to build a result set that includes the plurality of configuration fingerprints for the plurality of storage systems. The configuration analyzer is configured to identify a plurality of standard configurations for the plurality of storage systems from the result set based on the plurality of configuration fingerprints. The configuration analyzer is configured to determine that a first storage system from the plurality of storage systems meets a standard configuration from the plurality of standard configurations. The configuration analyzer is configured to create metadata within the first storage system that describes the standard configuration.

Another embodiment provides for a computer program product for managing one or more standard configurations comprising a computer readable storage device having a computer readable program stored therein, wherein the computer readable program, when executed on a computing device, causes the computing device to calculate a plurality of configuration fingerprints for a plurality of storage systems, a configuration fingerprint is a numerical value that represents information about a configuration for one or more components of a storage system. The computing readable program causes the computing device to build a result set that includes the plurality of configuration fingerprints for the plurality of storage systems. The computing readable program causes the computing device to identify a plurality of standard configurations for the plurality of storage systems from the result set based on the plurality of configuration fingerprints. The computing readable program causes the computing device to determine that a first storage system from the plurality of storage systems meets a standard configuration from the plurality of standard configurations. The computing readable program causes the computing device to create metadata within the first storage system that describes the standard configuration.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
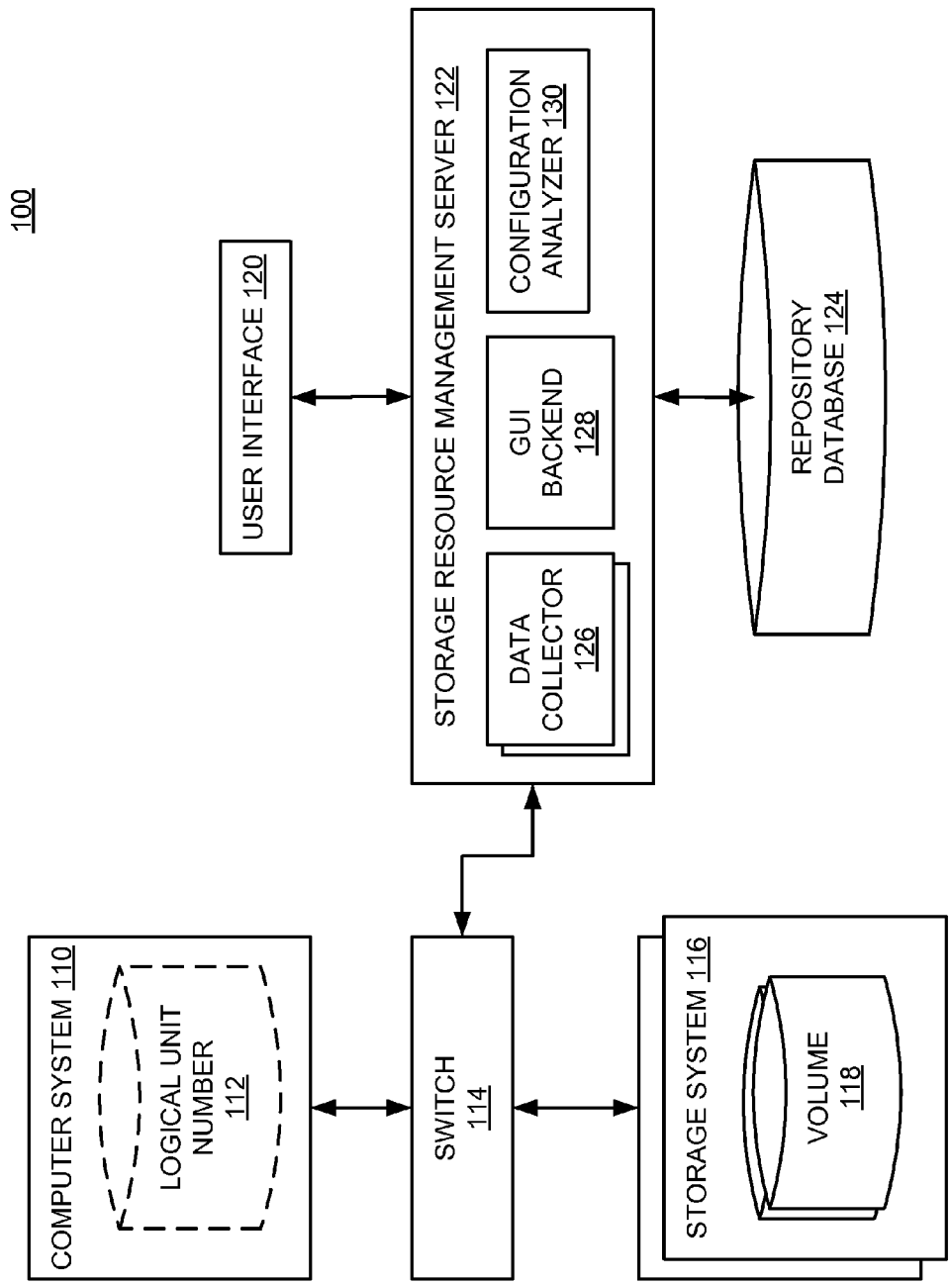
FIG. 1 illustrates a block diagram of a storage network management system for analyzing a storage system and associating the storage system with a standard configuration, according to various embodiments.

While the invention is amenable to various modifications and alternative forms, specifics thereof have been shown in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to storage devices, more particular aspects relate to configuration identification within storage devices. For example, aspects of the present disclosure relate to identifying standard configurations of storage systems. The identification of the standard configuration begins by creating/building a result set with multiple configuration fingerprint values that matches configuration fingerprint values to a storage system. Aspects of the present disclosure also relate to analyzing the result set to determine the standard configuration of a storage system using the configuration fingerprints. If a storage system has an associated standard configuration, then the standard configuration can be written to metadata for the storage system. While the present disclosure is not necessarily limited to such applications, various aspects of the disclosure may be appreciated through a discussion of various examples using this context.

Cloud computing is becoming the dominant way of managing information technology at the infrastructure level, independent of whether the cloud is a public cloud (i.e. resources are managed for usage outside of the providing organization) or a private cloud (resources are managed and consumed within an organization). In the private cloud paradigm, cloud computing will have significant impact on data centers owned by companies providing Information Technology (IT) services for their own business units, since cloud computing promises a lot of benefits for the consumers of the IT services.

One of the key aspects making the benefits of cloud computing possible is the ability to leverage a high degree of automation, and standardization and categorization using metadata (which describes the managed entities from the standardization perspective to allow for the consistent and automated handling needed), to accelerate IT infrastructure configuration changes, lower administrative burden, and enable IT services to be provided to end-users in a self-serve manner. Examples of this metadata include the standardized descriptions and assessments of infrastructure capabilities in performance, availability, accessibility, etc. The standardized descriptions also refer to standard configurations.

Independent of the cloud paradigm, storage administrators can aim for more simplistic standardizations independent of a cloud management model, in order to deal with the complexity of managing a large number of individual but related entities. Examples of such standardizations are the usage of naming conventions, the dedication of certain storage systems or storage pools to certain usages, or the usage of certain configuration options as a kind of template.

The management of storage environments may involve using manual processes that are planned in detail and initiated by the storage administrators, although the process is sometimes supported by tools or scripts for certain operations. Some storage environments include deviations from a standard configuration of a storage environment because either the request was handled as a one-off, a storage device was not available at the time due to maintenance, or a template was not properly applied. Another possible reason for deviations is the ongoing adjustment of standards/templates over time, e.g., to address lessons learned, changed environment constraints, or new personnel.

The term standard as used in the present disclosure describes a certain configuration (i.e., a standard configuration) of a particular type of managed storage system. There might exist multiple storage systems with the same standard in a given storage environment to reflect different capabilities of and/or address different requirements for storage systems. The standards represent reoccurring capabilities/requirements using for a larger number of managed entities to allow efficient management of said entities, for example using automation. The term service class and standard configuration is used interchangeably as well.

Some storage environments are comprised of an often unmanageable number of configurations, which may be a result of either matching a standard used by the organization (or a former version of the standard) by identifying a configuration close to the standard with varying degrees of deviations, or the configuration may be individually configured for various reasons, e.g., one-offs etc.

In various embodiments of the disclosure, standards can be identified and all the managed storage systems compliant to the standard (including those following other standards which are similar to the standard) can associate the necessary metadata in an automated fashion. Embodiments of the present disclosure may enable a larger number of organizations to benefit from the advantages of cloud-like infrastructure management, e.g., as increased efficiency, faster reaction to storage requests, or improved environment utilization.

By identifying a set of standard configurations for the managed entities (which can smaller than the total number of unique configurations present in most grown storage infrastructures), the management of the managed entities can be automated and streamlined, resulting in lower requirements for manual administrator intervention. Managed entities not currently meeting any of the identified standard can be manually or automatically transformed to be compliant with the standard being closest to their current configuration. Also, once associated with a standard configuration, the managed entity can be monitored for staying in compliance with the associated standard. A managed entity is a storage system that is being managed by a storage resource management server. Throughout the disclosure, the term storage system can be used interchangeably with managed entity.

The usage of standards in the configuration of storage systems enables/facilitates automation to improve efficiency in storage management and allows the usage of the available storage resources by potentially adjusting the standard definition (and hence the configuration of the managed entities associated with the standard) to optimize with respect to resource consumption (like CPU usage, cache usage, etc.) in the used storage infrastructure.

FIG. 1 illustrates a block diagram of a storage network management system 100 for analyzing a storage system and associating the storage system with a standard configuration, according to various embodiments. The storage network management system 100 can have a storage resource management server 122. The storage resource management server 122 can control the storage for a storage network management system 100. Aspects may include the transfer of files between storage volumes or different computing systems, or the amount of a data that any particular storage device may hold at any time.

The storage resource management server 122 can be connected to a repository database 124. The repository database 124 may be a corresponding connected central repository to store all relevant system and infrastructure data. In various embodiments, the repository database 124 may also store a result set. The result set (described further herein) may be a database/table of all of the storage system identifiers (IDs) for the storage systems and their respective configuration fingerprints. The result set may contain more information about the specific configuration that produced the configuration fingerprints. The configuration fingerprint is a numerical value that represents information about a configuration for one or more components of a storage system. In various embodiments, the configuration fingerprint is a number indicating a specific type of configuration for a storage system. The configuration fingerprint may also be a specific grade or score relating to the configuration, e.g., grade A high speed, grade B medium-speed, etc. The term configuration fingerprint values may be used interchangeably with configuration fingerprint throughout this disclosure.

The storage resource management server 122 can also interface with user interface 120. The user interface 120 may be a graphical user interface (GUI) that visualizes required information for an end user. The user interface 120 may also allow configuring and maintaining the system. The storage resource management server 122 can have a GUI backend 128 that facilitates communication between the user interface 120 and the storage resource management server 122.

The storage resource management server 122 may also include one or more data collectors 126. The data collector 126 can be configured to gather information from the storage network infrastructure via their connectivity to Storage Area Network (SAN) devices, e.g., switches/fabrics 114, storage systems 116, or computer systems 110.

The storage resource management server 122 may also include a configuration analyzer 130. Various aspects of the configuration analyzer 130 may relate to the present disclosure. For example, the configuration analyzer 130 may analyze an existing storage environment for used standards, identify the standards, and create the metadata with the standard configuration for the managed storage systems.

The configuration analyzer 130 can analyze one or more storage systems 116. In various embodiments a storage system 116 is a logical construct such as a volume. The volume may refer to a logical storage unit. The storage system 116 may also refer to a physical device, such as a hard drive. The configuration analyzer 130 can determine a Configuration Fingerprint (CF) for a storage system 116. The configuration analyzer 130 may also store additional information in the repository database 124 of the storage resource management server 122 as needed. For example, the configuration analyzer 130 may store the CF values within the repository database 124.

The configuration analyzer 130 may also analyze the data from the result set in the repository database 124. As a result of the analysis, managed entities to be inspected would either be categorized as being of a particular standard (and have the corresponding metadata of the managed entity associated by writing the standard to the metadata), or marked as one-off configurations which require a storage administrator to categorize them manually.

In case no significant accumulation of managed entities having the same or close by CF values can be determined based on the analysis of the managed environment, a manual classification/association between managed entities and manually defined standards may be necessary.

Storage systems (also referred to as managed storage entities) may refer to all elements of the managed storage environment (e.g., the storage network management system 100), which might be relevant for a cloud-like management approach as discussed in this document, e.g., storage volumes, file shares, or storage pools. The term volume can refer to a particular type of managed entity used in block storage systems to represent the logical storage unit presented to a consuming computer. The configuration analyzer 130 can be configured to associate an unclassified storage system with one of the standard configurations found within the result set.

The storage resource management server 122 can be configured to support highly automated provisioning of relevant entities, e.g., creating standardized configurations of the corresponding entities based on template definitions or service classes (which can be parameterized), associating the necessary metadata (e.g., the used service class itself), as part of the automated provisioning. Based on this metadata association, other sophisticated management capabilities (e.g. optimization, data protection) can be enabled to be handled by the SRM server 122.

In various embodiments, the storage network management system 100 can be configured to be hosted in a cloud-computing environment. For example, aspects of the storage network management system 100, e.g., the repository database 124, and the storage systems 116, can benefit from improved latency from a cloud-computing environment. In particular, if the configuration analyzer 130 of the SRM server 122 is hosted on the same compute node as the repository database 124, and storage systems 116, then the performance improvements can be more pronounced. In various embodiments, the cloud computing environment can also allow the storage network management system 100 to rapidly scale additional storage systems 116 without significant infrastructure improvements.

Figure 2:
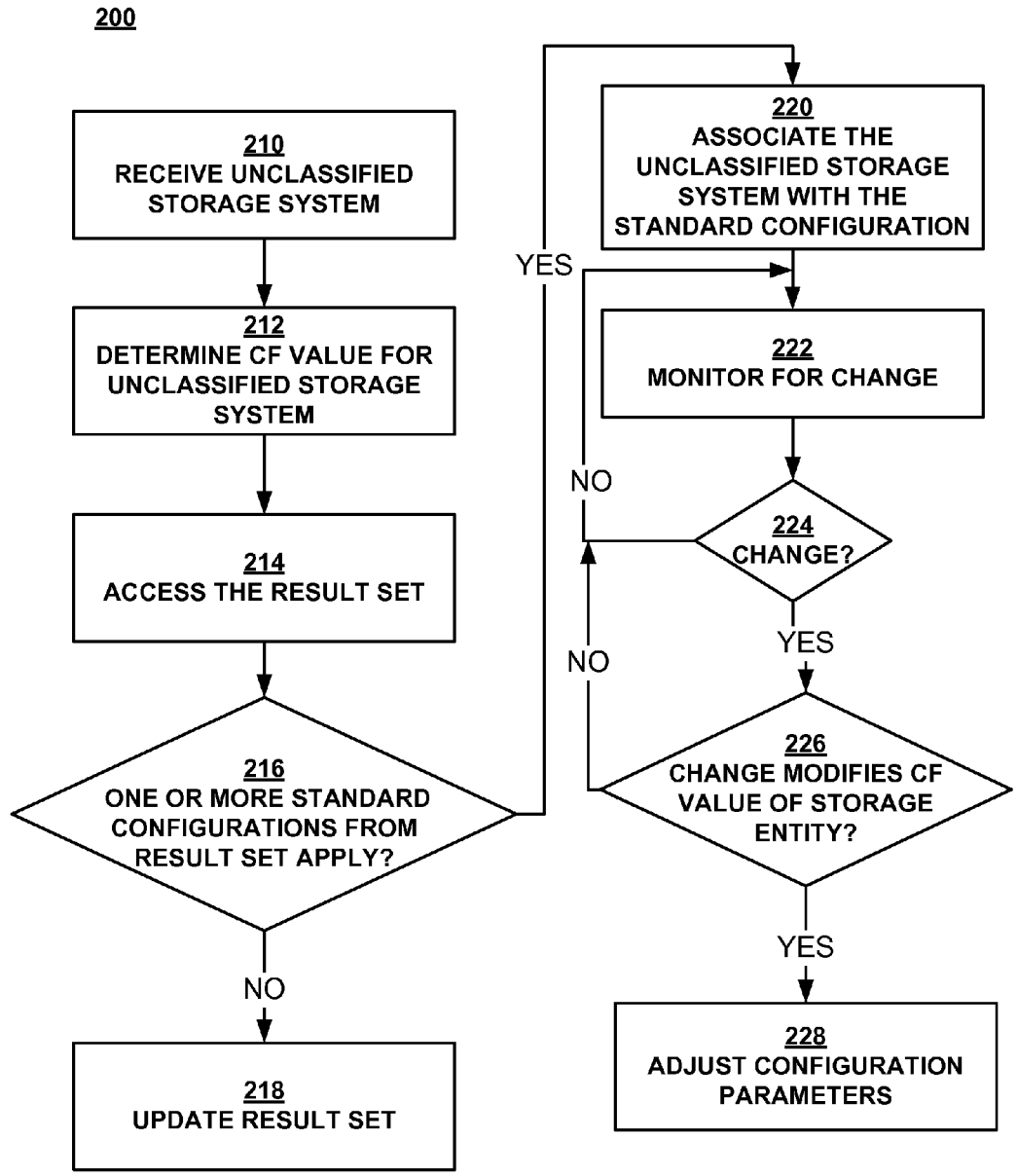
FIG. 2 illustrates a flowchart of a method for managing classification of a storage system, according to various embodiments.

FIG. 2 illustrates a flowchart of a method 200 for managing classification of a storage system, according to various embodiments. The method 200 is a sample implementation of how a configuration analyzer manages and determines a standard configuration for a storage system. More implementations are described further herein. The configuration analyzer can be responsible for receiving the storage system to be classified and associating the storage system with an existing standard configuration. A standard configuration can be based on a distribution analysis of CF values of storage systems within the result set. In various embodiments, once the configuration analyzer receives an unclassified storage system, the configuration analyzer can determine the CF value and determine if the CF value for the unclassified storage system falls within an existing standard. The method 200 may begin at operation 210.

In operation 210, the configuration analyzer may receive an unclassified storage system. The unclassified storage system may be any storage system or any granularity therein that does not have a corresponding standard configuration associated with the storage system. In various embodiments, the unclassified storage system may be actively scanned by the storage resource management server. The unclassified storage system may already be present in a result set without a corresponding standard associated with the unclassified storage system. Once the status of the unclassified storage system is determined, then the storage resource management server may activate the configuration analyzer and the method 200 continues to operation 212.

In operation 212, the configuration analyzer can determine a configuration fingerprint (CF) value for the unclassified storage system. The CF value can be determined using the metadata of the unclassified storage system. For example, the CF value can measure whether features on the unclassified storage system are utilized within the storage device, e.g., thin provisioning or the copy service. Each metadata field can have a certain weight associated with the field which is used to determine a CF value for the unclassified storage system. The CF value may be assigned to each managed storage system, and the determination can be further described herein.

In various embodiments, the CF value can be determined by receiving one or more configuration parameters for a managed storage system within a managed storage environment. The managed storage environment can be the same as the storage network management system and the managed storage system can refer to a classified or unclassified storage system. The configuration parameters may be based on metadata categories. For example, thin provisioning may be a configuration parameter. The CF value can be further determined by the configuration analyzer by calculating the configuration fingerprint value, based on the configuration parameters, for the managed storage system.

An aspect of the present disclosure involves determining the configuration fingerprint (CF) value. The CF value (which may also be referred to as a CF) is like a hash value in that the CF value corresponding to the storage system may be used in a table. For example, the CF value in the table may point to a variety of the factors that make up the CF value. The CF value can represent a certain configuration of a storage system (which may also be referred to as a managed entity), e.g., a storage volume. The CF value can take the relevant characteristics of the managed entity into account. Examples of relevant characteristics may include, storage system type, underlying disk technology, redundancy configuration, thin provisioning, encryption, compression, copy service configuration, naming conventions, or affinity/collocation.

In various embodiments, an algorithm can produce configuration fingerprints which would indicate, by taking the difference between two calculated CFs, by the magnitude by which the two configurations differ. That means that identical configurations would produce the same CF, and a configuration which differs only in a small aspect from another configuration would produce a CF very close to the other configuration's CF. The algorithm could use corresponding weighting to control the impact a given deviation from a configuration has on the difference in CF. Various embodiments may describe different methods of calculating a CF. These methods are described further herein. Once the configuration analyzer determines a CF value for the unclassified storage system, then the method 200 continues to operation 214.

In operation 214, the configuration analyzer can access a result set in a repository database. In various embodiments, accessing the result set occurs simultaneous with receiving the unclassified storage system. The result set can be a listing of various managed storage systems with the corresponding CF values for each managed storage system. In various embodiments, the result set can have a plurality of configuration fingerprints for a plurality of storage systems. The result set may be stored in local memory of the storage resource management servers or may be stored in a repository database accessible to the storage resource management servers. The result set may be stored in any format, e.g., in a separate file, in a structured or unstructured database, etc. Once the result set is accessed, then the method 200 can continue to operation 216.

In operation 216, the configuration analyzer determines whether one or more standard configurations apply to the unclassified storage system. The configuration analyzer may determine the standard configurations in the result set based on the CF values. For example, if each storage system in a grouping of storage systems have a similar CF value to each other, then each storage system within the grouping may be associated with a standard configuration. The configuration analyzer may also compare the CF value for the unclassified storage system (determined in operation 212) to the CF values for the standard configurations in the result set to obtain a standard configuration that can apply to the unclassified storage system. If a standard configuration does not apply, then the method 200 can continue to operation 218. If a standard configuration does apply, then the method 200 can continue to operation 220.

In operation 218, the configuration analyzer can update a result set with a new CF value for the unclassified storage system. The updating can occur by associating a new CF value with the unclassified storage system. In various embodiments, the configuration analyzer can create a new result set if there is not a result set accessible to the storage resource management servers. The result set can be updated by storing the configuration fingerprint value associated with the unclassified storage system in the result set. The CF value can be uploaded into the storage system accessible by the storage resource management servers.

In operation 220, the configuration analyzer can associate an unclassified entity with the standard configuration in response to a standard configuration applying to the unclassified storage system. For example, if a standard configuration applies to the unclassified entity, then the standard configuration can be noted by the configuration analyzer and stored along with data for the unclassified storage system. In various embodiments, the association can occur in a table, e.g., a structured database or the result set.

In various embodiments, managed storage systems not currently meeting any of the identified standards can be manually or automatically transformed to be compliant with the standard being closest to the storage system's current configuration. Also, once associated with a standard configuration, the managed entity can be monitored for staying in compliance with the associated standard.

The usage of standards in the configuration of storage systems enables/facilitates automation to improve efficiency in storage management and allows the optimal usage of the available storage resources by potentially adjusting a definition of a standard configuration (and the standard configuration of the managed storage systems associated with the standard configuration) to reduce resource consumption (like CPU usage, cache usage, etc.) in the used storage infrastructure.

In operation 210 thru operation 220, the unclassified storage system is associated with a standard configuration. In operation 222 thru operation 228, the storage systems within the result set (including the newly associated unclassified storage system) have associated standard configurations enforced. In various embodiments, the enforcement of the standard configurations can be optional depending on various system configurations.

In operation 222, the configuration analyzer can monitor a storage system associated with a standard configuration for a change in one or more configuration parameters. For example, if the storage system has three configuration parameters of Thin provisioning, Disk technology, and Copy Service, then a change is any configuration parameter can alert the configuration analyzer. In operation 224, if a change is detected, then the method 200 can continue to operation 226.

In operation 226, the configuration analyzer can determine whether the change modifies a configuration fingerprint of the storage system beyond a change threshold. The change threshold can represent the degree of permissible change for a configuration fingerprint. For example, if the change threshold is plus or minus 5%, then a 6% change in the CF value would modify the value of the storage system beyond the change threshold. If the change modifies the configuration fingerprint of the storage system beyond the change threshold, then the method 200 can continue to operation 228.

In operation 228, the configuration analyzer can adjust, in response to determining that the change modifies the configuration fingerprint of the storage system beyond the change threshold, one or more configuration parameters of the storage system. For example, if a storage system has three configuration parameters: Thin provisioning, Disk Technology, and Copy Service with a change in the thin provisioning from off to on, then the configuration analyzer can change the Copy Service to a different type in order for the storage system to have a CF value within the change threshold. The result of the adjustment may be reevaluated.

Figure 3:
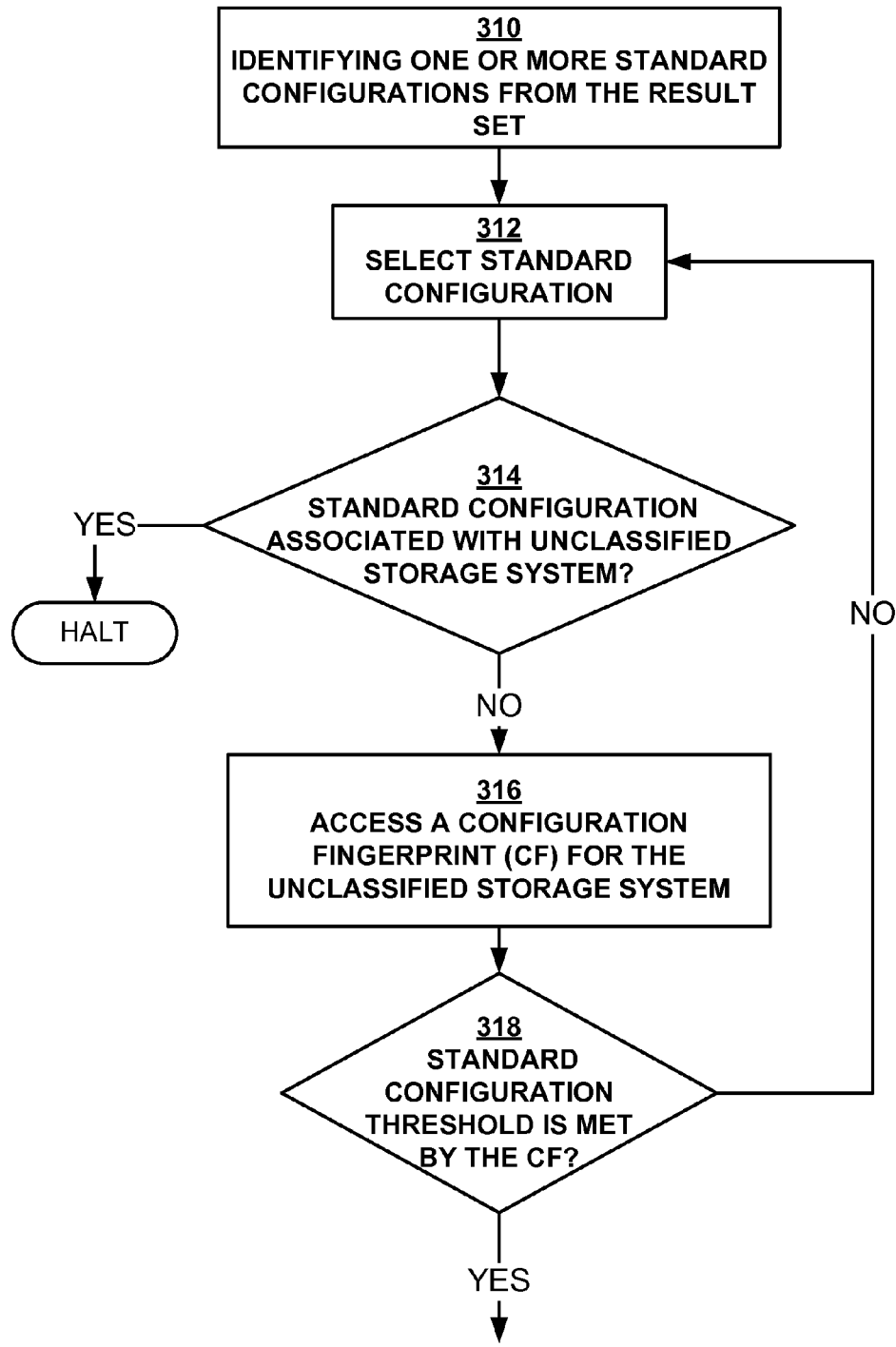
FIG. 3 illustrates a flowchart of a method for determining whether a standard configuration applies to an unclassified storage system, according to various embodiments.

FIG. 3 illustrates a flowchart of a method 300 for determining whether a standard configuration applies to an unclassified storage system, according to various embodiments. The method 300 can correspond to operation 216 in FIG. 2. The method 300 can involve identifying one or more standard configurations within the result set, selecting a standard configuration and determining if the CF value for the unclassified storage system is within the range of the standard configuration. The method 300 begins at operation 310.

In operation 310, the configuration analyzer can identify one or more standard configurations within the result set for the plurality of storage systems. Standard configurations may be determined through analysis of the result set. For example, the CF values may be utilized for each storage system. A distribution of the CF values may be analyzed through various statistical means, e.g., a histogram, linear regression, normalized distribution, etc. The distribution can indicate the various configurations of the storage systems that are related and represent a standard configuration for multiple storage systems. The distribution analysis may be described further herein. Once the standard configurations are determined by the configuration analyzer, then the method 300 continues to operation 312.

In operation 312, the configuration analyzer selects a standard configuration from the one or more standard configurations within the result set. The configuration analyzer may select the standard configuration to compare to the configuration for the unclassified storage system. In various embodiments, the unclassified storage system may be evaluated through other means, e.g., comparison, grouping, or priority. The standard configuration may be selected using a variety of methods, e.g., random or in a pre-defined order. Once the configuration analyzer selects a standard configuration, then the method 300 continues to operation 314.

In operation 314, the configuration analyzer may determine whether a standard configuration is associated with the unclassified storage system. The unclassified storage system may have a standard that is designated by the configuration analyzer. For example, there may be a standard configuration A which is used by default on all hard drives within the volume B. There may also be a standard configuration that was determined in previous result sets. For example, if, in a previous analysis of the result set, a storage system is associated with a standard configuration the storage system was classified. If the storage system is received, the method 300 halts because the storage system is already associated with a standard configuration. If the storage system is not classified, then the method 300 continues to operation 316.

In operation 316, the configuration analyzer can access the configuration fingerprint for the unclassified storage system in response to the standard configuration not being associated with the unclassified storage system. The configuration analyzer can access the CF value for the unclassified storage system by receiving the determined CF value from another source. In various embodiments, the CF value can be determined external to the configuration analyzer and may be received by the configuration analyzer. The CF value can be determined in prior operations. In various embodiments, the CF value can be determined by the configuration analyzer and then stored in memory for later retrieval. Once the configuration analyzer accesses the CF value for the unclassified storage system, then the method 300 can continue to operation 318.

In operation 318, the configuration analyzer can determine whether a threshold for the standard configuration is met by the configuration fingerprint for the unclassified storage system. The threshold can be a range of CF values that conform to a particular standard configuration. For example, if the threshold is a range of CF values from 500-550 and the CF value for the unclassified storage system is 525, then the threshold is met. The threshold can be described further herein. If the threshold for the standard configuration is met by the unclassified storage system, then the method 300 can continue. In various embodiments, the configuration analyzer can associate the unclassified storage system with the standard configuration in response to the configuration fingerprint for the unclassified storage system meeting the threshold. For example, the metadata of the unclassified storage system may be modified to refer to the standard configuration or an association table between one or more storage systems and the standard configurations may be updated. The association may be similar to the association of the unclassified storage system with the standard configuration described in operation 220 in FIG. 2.

If the threshold is not met, then the method 300 can continue to operation 312. In various embodiments, the configuration analyzer can select a second standard configuration (different than a first standard configuration) in operation 312. The configuration analyzer can evaluate whether a second threshold for the second standard configuration is met by the configuration fingerprint for the unclassified storage system.

Figure 4:
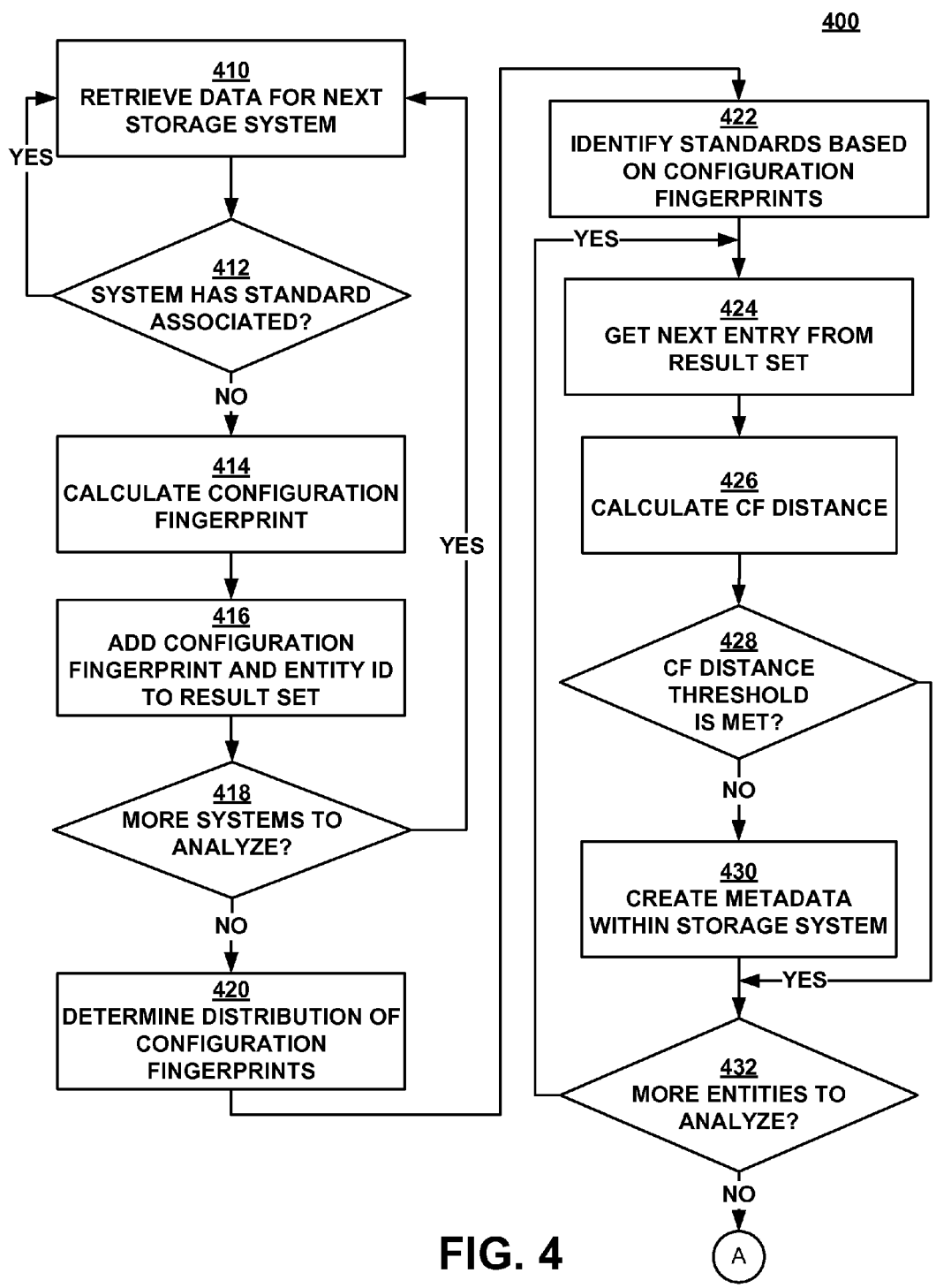
FIG. 4 illustrates a flowchart of a method for analyzing an environment to identify used standards and associating standards with appropriate storage systems, according to various embodiments.

FIG. 4 illustrates a flowchart of a method 400 for analyzing an environment to identify used standards and associating standards with appropriate storage systems, according to various embodiments. The method 400 may be a sample implementation of identifying the standard configurations within a result set and associating the standard with the storage system by writing the standard configuration in the metadata. Many of the operations in the method 200 may correspond to operations in the method 400. The method 400 may begin at operation 410.

In various embodiments, operation 410 thru operation 418 may be directed to building a result set from the storage systems. Operation 420 thru operation 428 may be directed toward identifying standards in the result set. From this, the identified standard associated is associated with a storage system.

In operation 410, the configuration analyzer can retrieve data for the next storage system. In various embodiments, the storage system can be synonymous with a managed entity and include a logical unit, e.g., a volume, or refer to a file share service. The data can include information regarding the configuration of the storage system or metadata regarding the standards associated with the storage system. In various embodiments, the storage system may have one or more components. The one or more components may point to a general configuration. Each component may have one or more properties or configuration parameters that describe the configuration. The configuration parameters may have a value. For example, if the component of the volume is a whether the volume uses a particular disk technology, then the configuration parameter is a Solid State Disk (SSD). The SSD configuration parameter will have a value of true or false. Once the configuration analyzer retrieves the data, then the method 400 continues to operation 412.

In operation 412, the configuration analyzer determines whether the storage system has a standard previously associated. Operation 412 may be similar to operation 314 in FIG. 3. If the storage system has a standard associated, then aspects of the method 400 do not apply and another storage system is selected.

In operation 414, the configuration analyzer can calculate the configuration fingerprint. The calculation of the CF may occur using a variety of methods and depends on the components of the storage system used. Generally, the calculation of the CF involves assigning a value to a configuration parameter that describes information about a configuration for the component, weighting the value for the configuration parameter; and aggregating a plurality of weighted values for a plurality of components. The building/calculating of the CF value may utilize the data retrieved in operation 410 and discussed further herein.

In operation 416, the configuration analyzer can add (write) a CF and entity ID to a result set that may be stored. As mentioned herein, the result set may be a repository or listing of all of the classified storage systems along with their respective CF values. The entity ID can correspond to a specific storage system so that the storage system can be readily identified. In various embodiments, the configuration analyzer can build a result set that includes the plurality of configuration fingerprints for the plurality of storage systems by adding. The building also includes accessing the plurality of storage systems, calculating a configuration fingerprint for each storage system from the plurality of storage systems, and adding the configuration fingerprint to the result set.

In operation 418, the configuration analyzer can determine if there are more storage systems to analyze. If there are more storage systems to analyze, then the method 400 can continue to select new storage systems to add to the result set. In operation 420, the configuration analyzer can determine the distribution of configuration fingerprints. The distribution of the CFs can be determined by a statistical analysis, such as a histogram of the CFs and volumes with CFs and described further herein.

In operation 422, the configuration analyzer identifies standards/service classes based on the CFs. The determination of the distribution of CFs in operation 420 is related to the identification of the standards in operation 422. For example, once the distribution of CF values is determined, then the standards can be identified based on the distribution. For example, if the distribution of CF values show clustering around a particular CF value, then the cluster may likely be a standard configuration. The determination of distributions and identification of the standards can be further described herein.

In operation 424, the configuration analyzer can obtain the next entry from the result set. In various embodiments, the next entry may have a CF value and entity ID, but no standard configuration associated. Operation 424 may correspond to operation 210 in FIG. 2, according to various embodiments. After the configuration analyzer gets the next entry from the result set, then the method 400 continues to operation 426.

In operation 426, the configuration analyzer calculates a distance between the CF value for the unclassified storage system and the range of acceptable CF values for a standard configuration. In various embodiments, the CF distance can be determined by taking the difference between the CF value and the mean or median CF value for a standard configuration. For example, if the median CF value for a standard configuration is 300 and the CF value for an unclassified storage system is 325, then the CF distance would be 25.

In operation 428, the configuration analyzer can determine if the CF value for the unclassified storage system is within a threshold. For example, if the CF value for the unclassified storage system is 240 and the range for the standard configuration is 275 to 325, then the CF value for the unclassified storage system would not be within the threshold. If the threshold is not met, then the method 400 can continue to operation 430.

In operation 430, the configuration analyzer can create metadata within the first storage system that describes the standard configuration. In various embodiments, the configuration analyzer can associate the closest standard with the storage system in response to the threshold not being met by the standard configuration. The closest standard (e.g., a second standard configuration) may be determined relative to the CF distance to the range of the standard configuration. For example, if the CF distance from the unclassified storage system to a first standard configuration is 300 but the CF distance from the unclassified storage system to a second standard configuration is 200, then the second standard configuration may be the closest.

The CF distance may be measured in an alternative manner based upon the CF distance being a range of CF values for a standard configuration within a result set. According to various embodiments, in operation 426, the CF distance may also be a range of CF values within a standard configuration. For example, the CF distance can be the range of CF values that are associated with a particular standard configuration. A standard configuration may also have a CF distance threshold. The CF distance threshold sets the permissible difference from a low CF value to a high CF value for a grouping of CF values to be associated with a standard configuration.

In operation 428, the configuration analyzer can determine whether the CF distance threshold is met for a particular standard. For example, if a CF distance between a storage system with a low CF value and a storage system with a high CF value is 100 but a distance threshold is 75, then the distance between two storage systems is greater than the threshold and is thus not met. If the threshold is not met, the cluster of CF values is not sufficient to become a standard. Each value from the cluster of CF values can be associated with the closest (established) standard in operation 430. For example, if a cluster of CF values, including the unclassified storage system, does not meet a threshold for a standard configuration, then each storage system within the cluster can be associated with the closest standard configuration as defined herein. Once a standard configuration is associated with the unclassified storage system, then the method 400 continues to operation 432.

In operation 432, the configuration analyzer can determine whether there are more storage systems to analyze. For example, if there are more unclassified storage system within the result set, then the method 400 can continue to operation 424. Otherwise, the method 400 continues to reference A.

Figure 5:
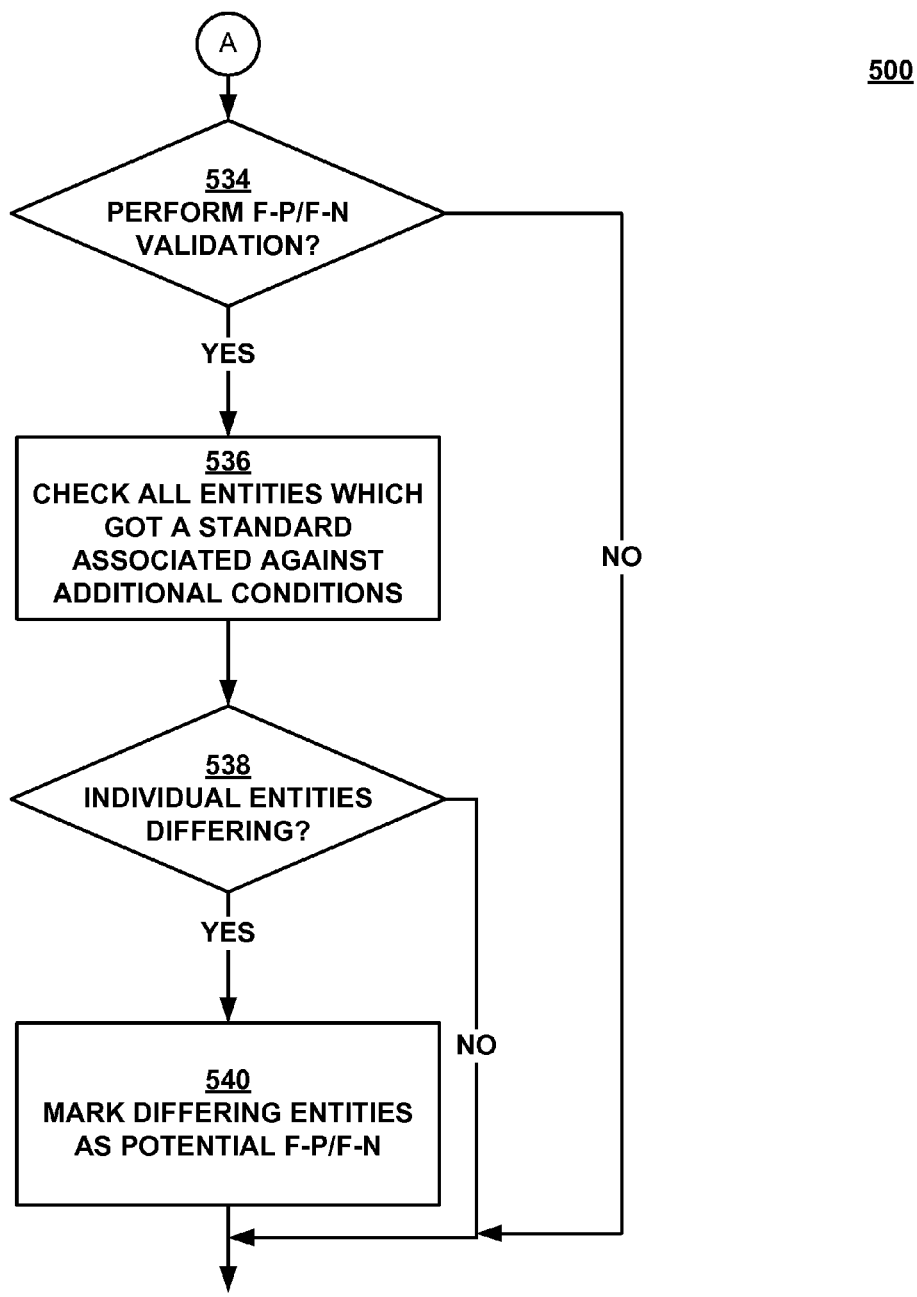
FIG. 5 illustrates a flowchart of a method of identifying storage systems that have a loose correlation to a standard configuration, according to various embodiments.

FIG. 5 illustrates a flowchart of a method 500 of identifying storage systems that have a loose correlation to a standard configuration, according to various embodiments. The method 500 can include checking the storage systems against additional conditions, and determining whether the entities differ, and marking the storage systems as potential false-positive/false-negative. The method 500 may continue from reference A in FIG. 4. The method 500 begins at operation 534.

In operation 534, the user can determine whether to perform a false positive (F-P) and false negative (F-N) validation. For example, the type of applications using the volume could be used to check similarity from an additional point of view. If, based on the CF analysis, a set of volumes may be determined to be the same, then a false positive classification might be designated when almost all volumes are used by a particular type of application and only a few are used by a different type of application. The false positive and false negative can be determined in a variety of manners. For example, in a false positive situation where 50 storage volumes use a standard configuration of a database application, 49 storage volumes can be used by a database app, while 1 storage volume used by a web streaming app could be erroneously assigned to the standard configuration of the database application. In a false negative situation, the standard configuration for a database application may not be associated with a storage system but various indications indicate that the standard configuration should be used. The configuration analyzer can validate the false-positive, false-negative by evaluating the result set against a history of user changes.

In operation 536, the configuration analyzer checks all storage systems against additional conditions. The additional conditions may concern properties that are not considered in the CF. For example, if the CF considers volume size, thin provisioning, and compression, but not encryption, then the additional consideration may include encryption. The encryption may be weighted in a different manner than the other CF factors. Detecting the F-P/F-N may include the presence or absence of an additional factor. For example, in a F-P situation where the a storage system is classified wrongly in a first standard, the presence of an additional conditions (e.g., encryption) may help distinguish the storage system from other storage systems in the first standard and associate the storage system to a second standard that uses the additional conditions.

In operation 538, the configuration analyzer can determine if the storage systems differ when additional conditions are considered. For example, for a first storage system and a second storage system associated with a first standard where an additional condition of encryption is considered, the second storage system may no longer work with the first standard and the two storage systems differ. If the storage systems differ, then the method 500 continues to operation 540. If the storage systems do not differ (e.g., the first storage system and second storage system still correspond to the first standard after the additional condition is considered), then the method 500 may halt.

In operation 540, the configuration analyzer can mark the storage systems that differ as potential F-P/F-N. The marking can occur at a table for the result set. For example, in addition to the standard configuration and the entity ID, the table may also have information related to whether the standard configuration of the entity ID is also a potential false positive or potential false negative. The configuration analyzer can alert a user that the storage system is a potential F-P/F-N and encourage the user to take further action. In various embodiments, a storage system that is marked as a potential F-P/F-N can be removed from association with the standard configuration.

Figure 11:
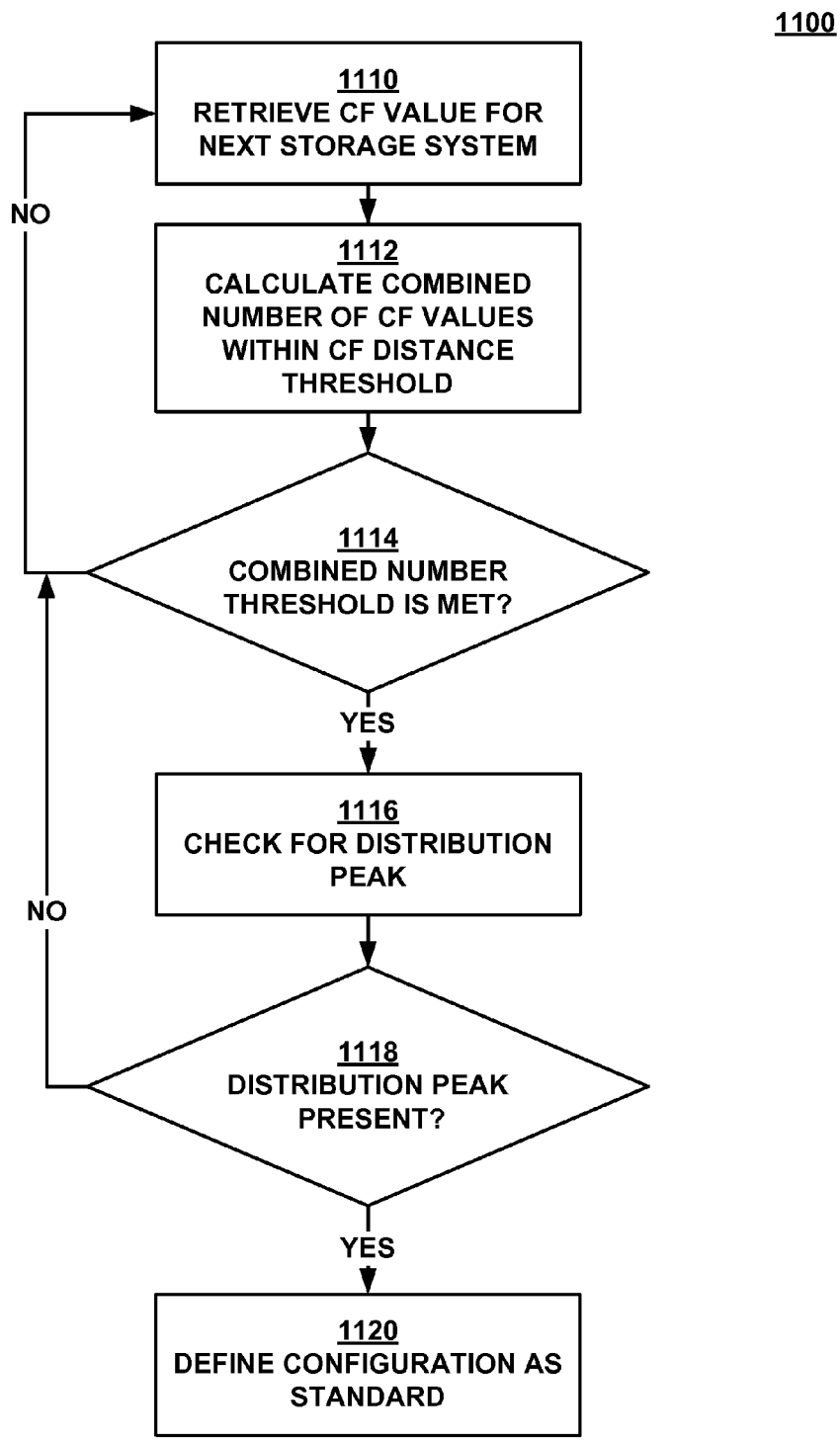
FIG. 11 illustrates a flowchart of a method for identifying standards within the result set, according to various embodiments.

Referring now to FIG. 11, FIG. 11 illustrates a flowchart of a method 1100 for identifying standards within the result set, according to various embodiments. The method 1100 can correspond to operation 422 in FIG. 4. The method 1100 can involve calculating a combined number of all CF values within the CF distance threshold and ensuring that the combined numbers are within various thresholds before determining that a CF value is within a standard configuration. The method 1100 may begin at operation 1110.

In operation 1110, the configuration analyzer can retrieve the CF value for a next storage system. In operation 1112, the configuration analyzer can calculate the combined number (i.e., value) of all CF values within a CF distance threshold. For example, the CF distance threshold can be a range of CF values that would create a standard configuration. The sum or combined number can be determined by taking the aggregate number of storage systems with the same CF value. For example, if there are if there are three CF values with a value of one-hundred, and two CF values with a value of one-hundred one within the CF distance threshold, then the combined CF value would be three and two respectively. In various embodiments, the combined numbers can also be determined using the total value of all CF values within the CF distance threshold. For example, if there are three CF values with a value of one-hundred, and two CF values with a value of one-hundred one within the CF distance threshold, then the combined CF value would be five-hundred two.

In operation 1114, the combined number is then compared to a combined number threshold. The combined number threshold may represent a minimum number of CF values to become a standard configuration, according to various embodiments. In various embodiments, the number of storage systems having a particular CF value, once exceeded, would create a sufficient data set to generate a standard configuration. If the combined number of CF values is greater than the combined number threshold, then the method 1100 can continue to operation 1116.

In operation 1116, the configuration analyzer can check for a distribution peak. The distribution peak may represent the CF value associated with a number of storage systems. In various embodiments, the distribution peak may represent a local maximum, i.e., a set of clustered CF values where there is a greater number of storage systems with a CF value than the next similar CF value. For example, if a first CF value has 20 storage systems and a second similar CF value (within a combined number threshold) has 10 storage systems, then there may be a distribution peak present. If the distribution peak is present, then the method 1100 can continue to operation 1120. If the distribution peak is not present, e.g., when a first CF value and a second CF value have an equal number of storage systems associated, then the method 1100 can continue to operation 1110. In operation 1120, the configuration analyzer can define the configuration of the CF values within the combined number threshold, i.e., the cluster, as the standard configuration. In various embodiments, defining is similar to associating the standard configuration with the storage systems having the CF values.

Figure 6:
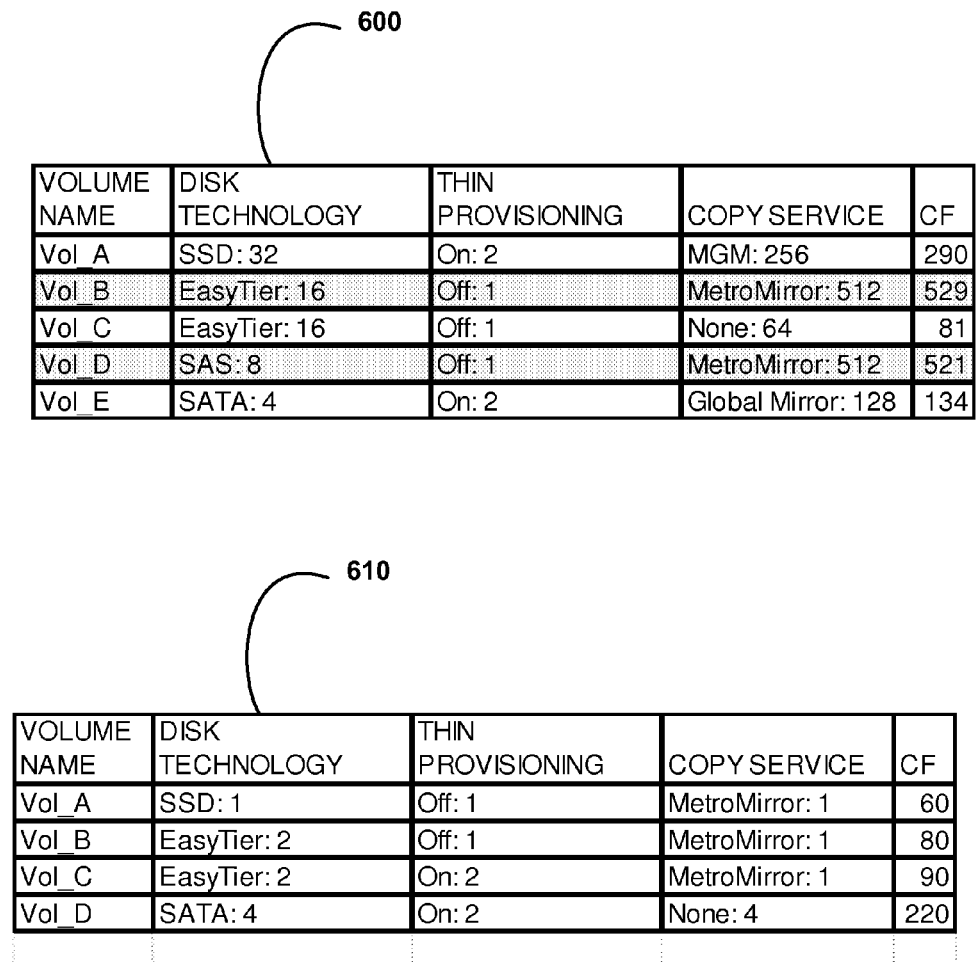
FIG. 6 illustrates various embodiments of a result set for the analysis of storage systems, according to various embodiments.

FIG. 6 illustrates embodiments of a result set for the analysis of storage systems, according to various embodiments. The embodiments can include table 600 and table 610 which may each use a different algorithm to determine a CF value. The following table 600 provides a list of different configuration, along with the resulting CF values. The difference in CF values between two volumes increases with the significance of the configuration differences between the volumes. For example, if volume A used EasyTier™ instead of Solid State Disk (SSD) as a disk technology, and no copy service, then the CF value of volume A would change. In various embodiments, a volume is created according to standards. Multiple standards can apply to the same volume. If the standard subsequently changes, then the volume may be reevaluated. If there are changes to storage practices, then the weighing may adjust to compensate. Various aspects may include using a bit field approach to store metadata, where bits of series of bits are used to determine the state of a particular attribute associated with the bit field.

In various embodiments, the table 600 may be created by the configuration analyzer independent of determining the CF value for an unclassified storage system. The table 600 may be modified in operation 416 in FIG. 4. The table 600 may also be accessed in operation 214 in FIG. 2 and operation 424 in FIG. 4.

An example of an algorithm using a bit field approach is provided in table 600. For example, Each characteristic to be considered for the CF of a given managed entity is assigned a specific bit in a bit vector, e.g., bit 0: Thin provisioning: Off ($2^0=1$); bit 1: Thin provisioning: On ($2^1=2$); bit 2: Disk technology: SATA ($2^2=4$); bit 3: Disk technology: SAS ($2^3=8$); bit 4: Disk technology: EasyTier ($2^4=16$); bit 5: Disk technology: SSD ($2^5=32$); bit 6: Copy services used: None ($2^6=64$); bit 7: Copy services used: GM ($2^7=128$); bit 8: Copy services used: MGM ($2^8=256$); bit 9: Copy services used: MM ($2^9=512$).

One important aspect of this sample algorithm is the non-linear increase in weight of each individual value of the chosen characteristics. The values need to be assigned to each of the bit position in such a way that the more the influence they have on the difference between managed entities with and without this value, the greater its resulting value is in the sample algorithm described here. In various embodiments, the sample algorithm includes increasing a first value to a second value, non-linearly, between configuration parameters.

In this example, the CF of a given managed entity is calculated by setting the bits in the bitfield corresponding to the characteristics of the given managed entity, and then simply using the resulting decimal value as the managed entity's CF.

In table 600, volumes Vol_B and Vol_D differ only slightly in the disk technology used (EasyTier vs. SAS), so the difference between their CFs is relatively small, being an indication that a single standard could potentially be defined for both volumes. Then, one of these volumes could be transformed (e.g. migrated to a different storage pool) to fulfill the disk technology prescribed by the standard.

In the algorithm, the significance of the individual settings can be adjusted by shifting the position either left or right in the bit-field to either increase or decrease the significance for the fingerprint value. In addition, it may be possible to adjust the inclination of different values by combining them into fewer bits (for example, by using just 2 bits to represent the four possible values for disk technology instead of 4 bits). In various embodiments, an algorithm using prime numbers instead of the bit values might be used to calculate the CF or any other mechanisms satisfying the constraints of the fingerprint algorithm.

In the table 600, the volume name may refer to the storage system. The disk technology, thin provisioning, copy service can refer to components. The types of disk technology, e.g., SSD, EasyTier, SAS, SATA, may all refer to types of configuration parameters. Each configuration parameter may have one or more values that represent various options of the configuration parameter.

In table 610, a result set embodiment featuring a second example of an algorithm is provided. For example, a configuration analyzer can consider the storage system's configuration parameters of Disk technology, Thin provisioning, and Copy service configuration. The configuration parameter values could resemble the following: Disk technology: SSD: 1, EasyTier: 2, SAS: 3, SATA: 4; Thin provisioning: Off: 1, On: 2; Copy service configuration: MetroMirror: 1, MetroGlobalMirror: 2, GlobalMirror: 3, None: 4.

The configuration parameter which is to make the most difference in the CF calculation in this example is the copy service configuration, followed by disk technology, and then by thin provisioning. The corresponding weighting factors thus are the following: Disk technology: 20, Thin provisioning: 10, Copy Service Configuration: 30. In this example, the CF is calculated by multiplying the configuration parameter value with the corresponding weighting factor, and then summing up the resulting products across all CF parameters considered.

Figure 7:
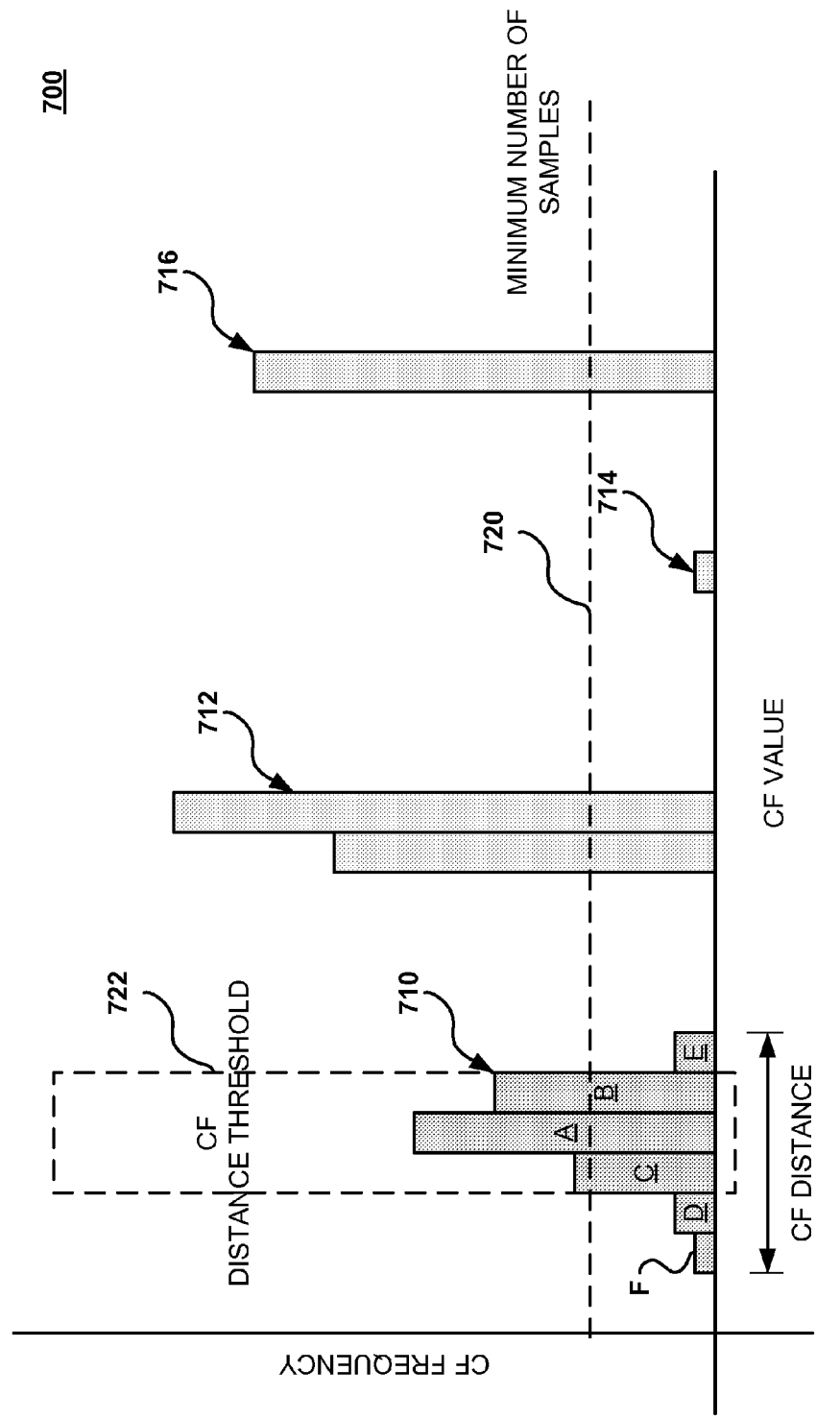
FIG. 7 illustrates a histogram representing CF values from a result set, according to various embodiments.

FIG. 7 illustrates a histogram 700 representing CF values from a result set, according to various embodiments. The histogram 700 can be used to determine the distribution of CF values for a plurality of storage systems (and entity IDs). The histogram 700 can have one or more clusters of CF values (e.g., 710, 712, 714, 716). Each cluster may be similar in CF value and may correspond to a standard configuration. Four potential clusters (e.g., 710, 712, 714, and 716) are shown in the histogram.

For the used standard configurations, a large number of configuration fingerprint values being either equal or only differing in few aspects would be expected. As shown in the histogram 700, the standard configurations would show up as groupings/clusters of CF values with a high number of repeat CF values. The CF values would have a CF frequency that indicates how many times a CF value appears for the plurality of storage systems. One-off configurations (e.g., cluster 714) would have a small quantity of storage systems with similar CF values using the standard configuration.

An identification algorithm using thresholds and CF distance measuring can be used to find multiple standard configurations using thresholds (e.g., 722) and CF distance boundaries (e.g., 714) in order to be adaptable to the analyzed environment.

For example, in cluster 710, there may be multiple storage systems with the same CF. Each CF value may be represented by A, B, C, D, E, and F with the frequency of CF values determining the height. The range or CF distance may be determined. The CF distance extends from E to F. The cluster 710 may have a certain number of values to be considered 720. The certain number establishes a baseline for the sample size to be considered a data point. In this example, A, B, and C meet the minimum 720. The CF value A would also be considered a distribution peak. In various embodiments, the minimum number 720 consideration may be optional.

A CF distance threshold may 722 also be applied. Any CF values outside of the threshold may not be considered part of the standard configuration. For example, D, E, and F do not meet the threshold 722 or the minimum 720 and would not be considered part of the standard configuration. However, D, E, and F are close enough to the cluster 710 and the corresponding standard configuration that the storage systems corresponding to D, E, and F may be considered associated with the standard configuration.

Applying the analysis to the other clusters (e.g., 712, 714, and 716), only 712, and 716 would be considered standards based on the CF threshold 722 used. For example, 712 and 716 meet the minimum number of samples 720 threshold and have little variance (CF distance). Cluster 714 would not be a standard configuration because the minimum number of samples was not reached.

In different embodiments of the present disclosure, the identification of the standards to be used could occur through manual selection, by a storage administrator, of managed entities known to be compliant with the standard. The identification of standards to be used could also occur based on CF values of the configurations of previously defined standard configurations that define the standard configurations to compare with. For example, if a storage system has a CF value of 400, and a first standard configuration has a permissible range of 344-422 and a second standard configuration has a permissible range of 222-955, then the storage system can be compared against the first standard configuration and the second standard configuration.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
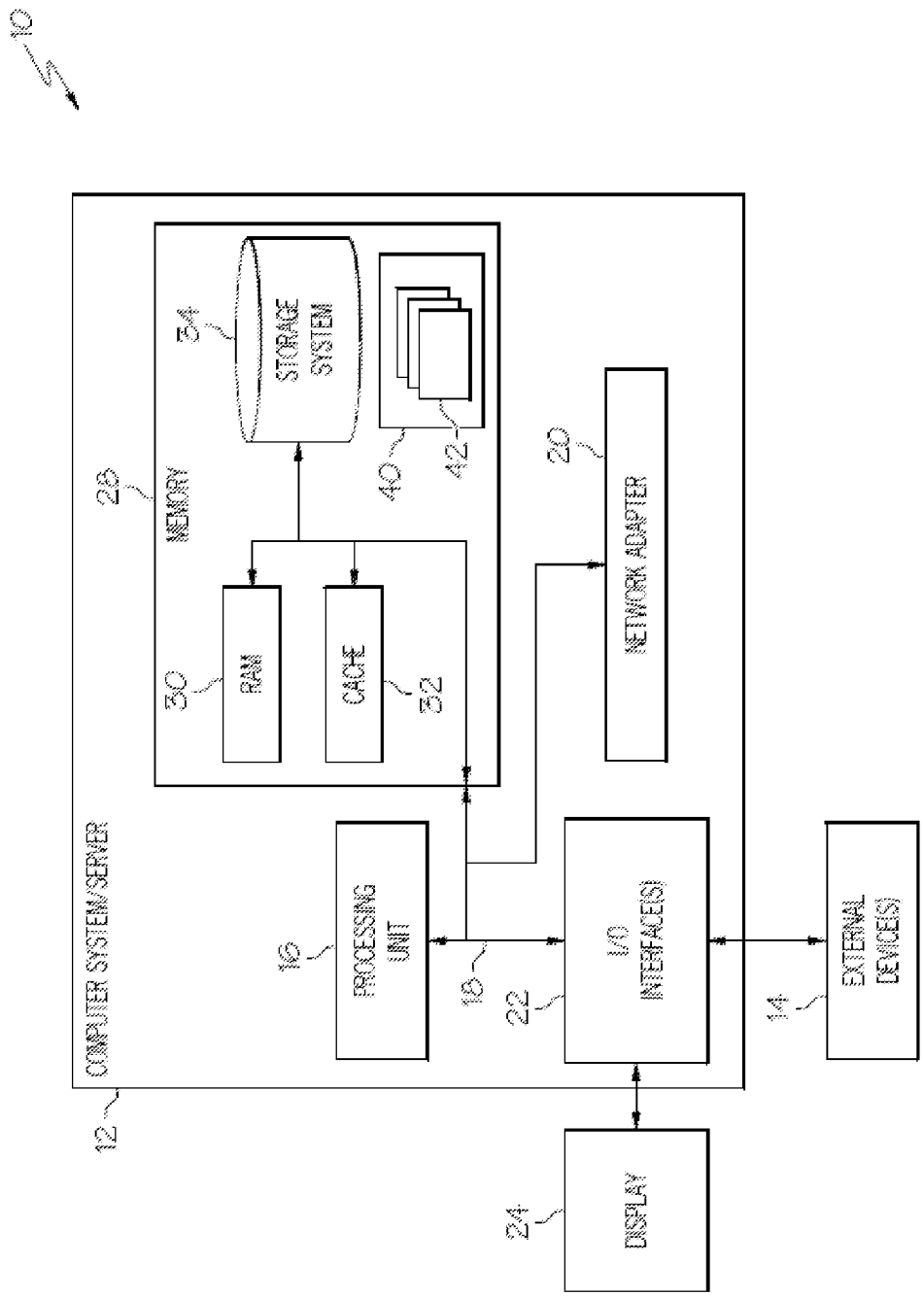
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
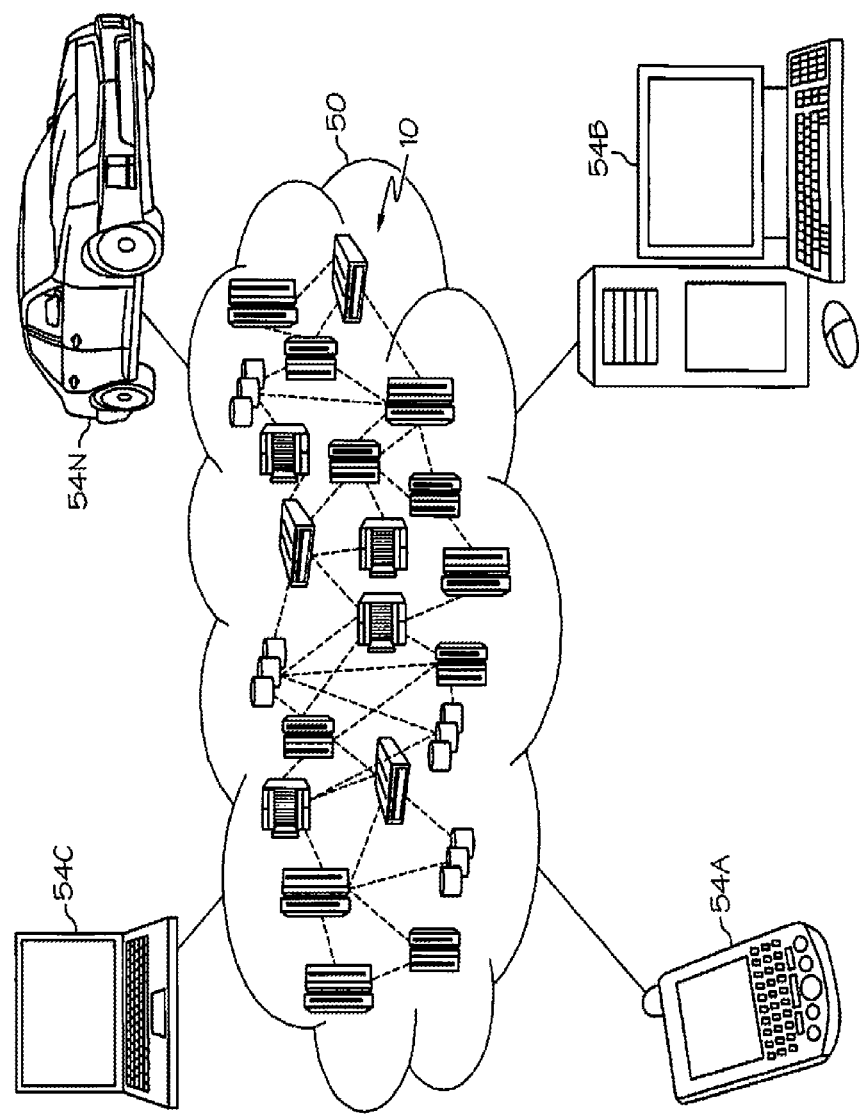
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
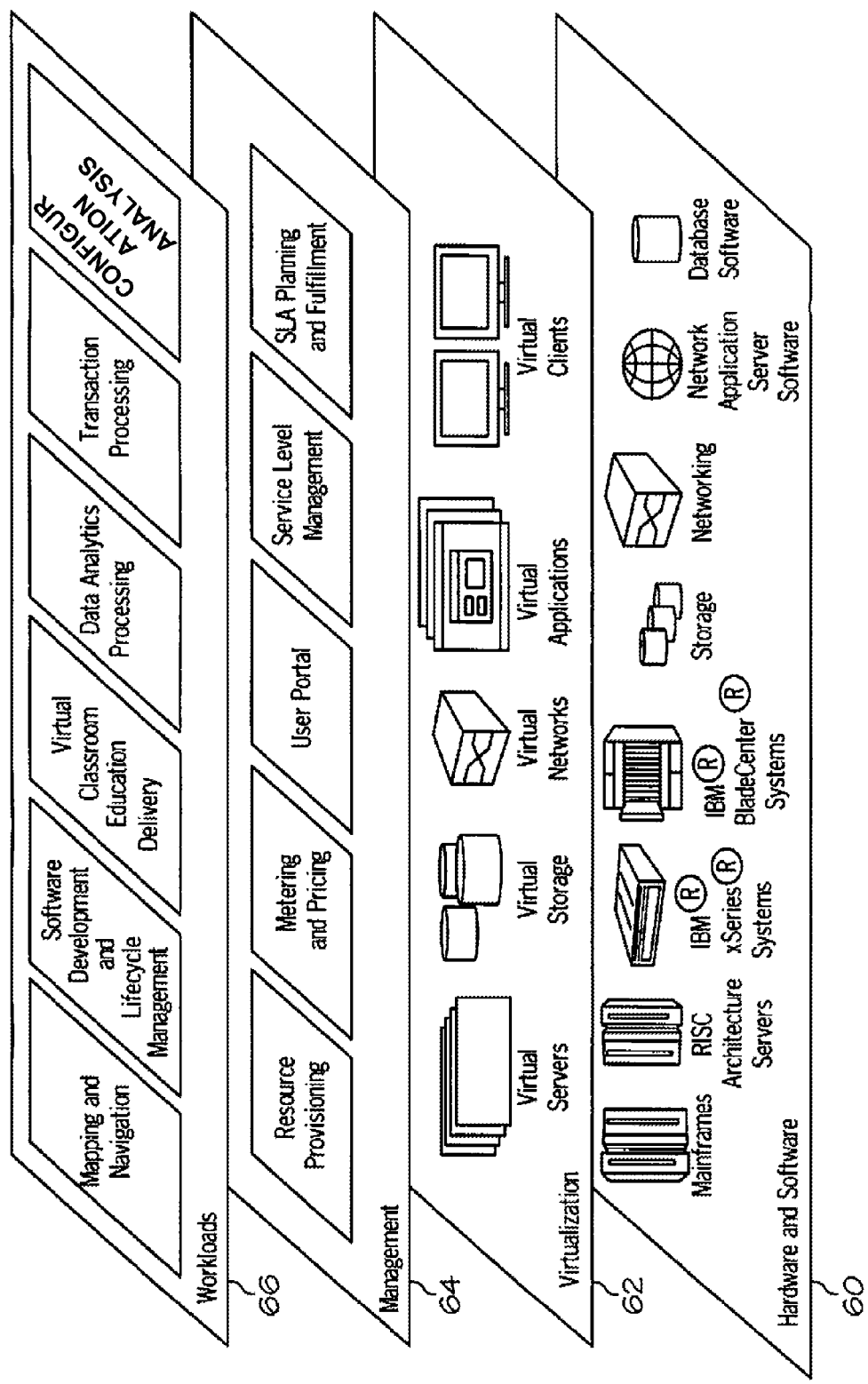
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and configuration analysis. For example, the configuration analysis may be performed by the configuration analyzer within a storage resource management server. The configuration analysis may include evaluating one or more storage systems for standard configurations used by the storage system and matching an unclassified storage system with a standard configuration.

Referring to FIGS. 1-11:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for identifying a standard configuration, comprising:
    calculating a plurality of configuration fingerprints for a plurality of storage systems, wherein a configuration fingerprint is a numerical value that represents information about a configuration for one or more components of a storage system;
    building a result set that includes the plurality of configuration fingerprints for the plurality of storage systems, wherein the building comprises:
        accessing the plurality of storage systems;
        matching a configuration fingerprint, from the plurality of configuration fingerprints, with a storage system from the plurality of storage systems; and
        adding the configuration fingerprint to the result set;
    identifying a plurality of standard configurations for the plurality of storage systems from the result set based on the plurality of configuration fingerprints, wherein the identifying comprises:
    calculating a configuration fingerprint distance for a cluster of configuration fingerprints within the result set;
    determining whether a configuration fingerprint distance threshold is met by the configuration fingerprint distance;
    calculating a combined number for the plurality of configuration fingerprints within the configuration fingerprint distance threshold;
    determining whether a combined number threshold that describes a number of storage systems for a configuration fingerprint is met;
    determining whether a distribution peak for one or more configuration fingerprints is present;
    defining, in response to the distribution peak being present and the combined number threshold being met, the standard configuration for the storage system in the plurality of configuration fingerprints; and
    writing, in response to the configuration fingerprint distance meeting the configuration fingerprint distance threshold and to the defining, the standard configuration to metadata of one or more storage systems within the cluster of configuration fingerprints;
    determining that a first storage system from the plurality of storage systems meets a first standard configuration from the plurality of standard configurations; and
    creating metadata within the first storage system that describes the first standard configuration.

2. The method of claim 1, wherein a storage system includes a volume that represents a logical storage unit.

3. The method of claim 1, wherein calculating a configuration fingerprint includes:
    assigning a value to a configuration parameter that describes information about a configuration for the component;
    weighting the value for the configuration parameter; and
    aggregating a plurality of weighted values for a plurality of components.

4. The method of claim 3, wherein weighting the value includes increasing a first value to a second value, non-linearly, between configuration parameters.

5. The method of claim 1, wherein determining that the first storage system meets the first standard configuration includes:
    comparing the configuration fingerprint for the first storage system to a configuration fingerprint threshold for the first standard configuration;
    determining whether the configuration fingerprint for the first storage system meets the configuration fingerprint threshold; and
    identifying, in response to determining that the configuration fingerprint meets the configuration fingerprint threshold, the configuration fingerprint for the first storage system as meeting the first standard configuration.

6. The method of claim 1, further comprising:
    checking the first storage system and a second storage system associated with the first standard configuration in the result set against one or more conditions;
    determining whether the first storage system and the second storage system differ with regard to the one or more conditions; and marking the second storage system as a potential false positive for the first standard configuration.

7. The method of claim 1, further comprising:

monitoring a storage system associated with the first standard configuration for a change in a value for one or more configuration parameters;

determining that the change in the value modifies a configuration fingerprint of the storage system beyond a change threshold; and adjusting one or more configuration parameters of the storage system.

* * * * *